May 21, 1929. N. H. DAVIS 1,714,000
SCOOTER BRAKE
Filed Nov. 9, 1926
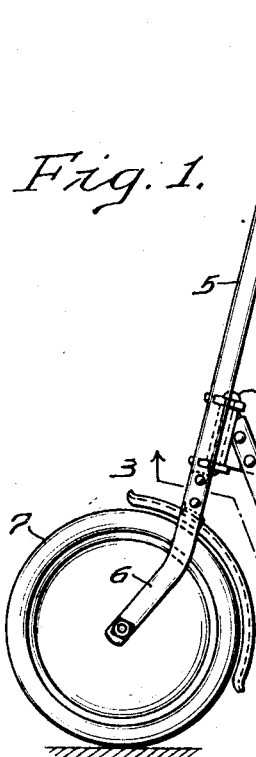
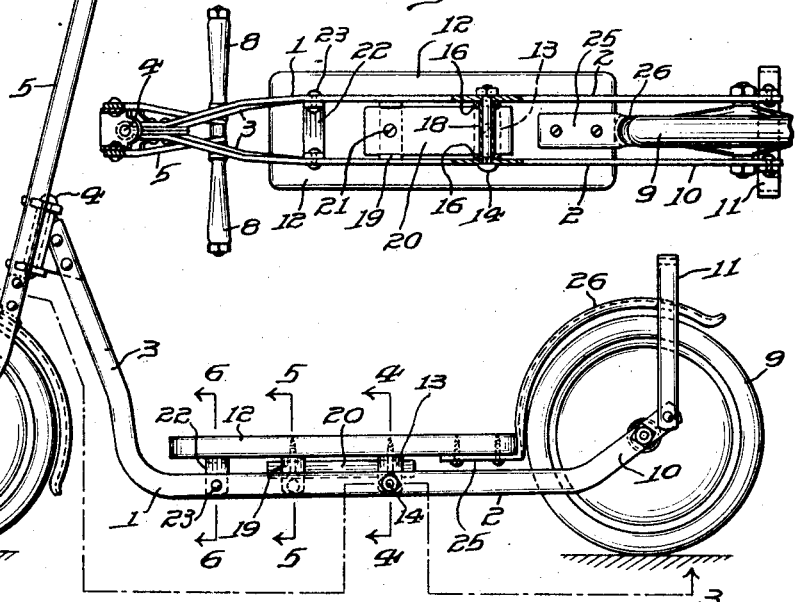
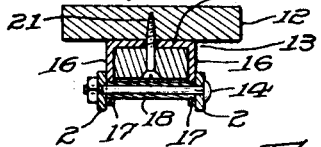
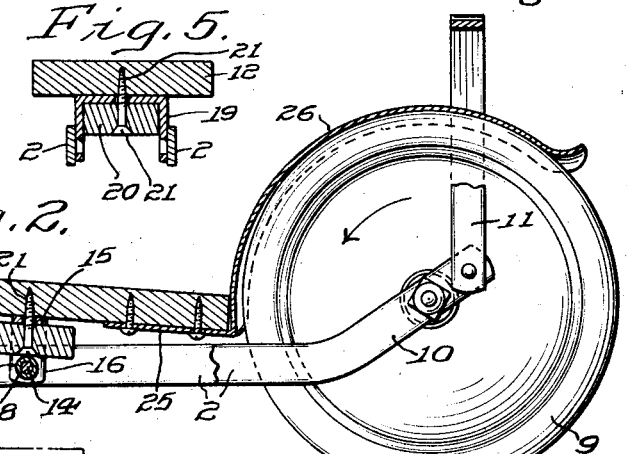
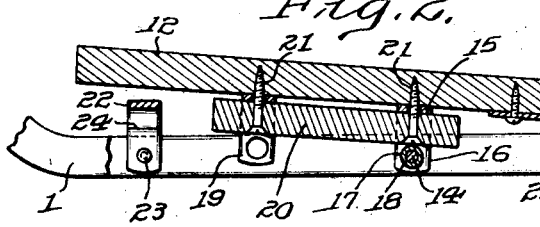
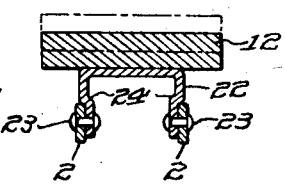
INVENTOR
Nathan H. Davis.
BY John D. Myers
ATTORNEY
WITNESS
F. J. Hartman.

Patented May 21, 1929.

1,714,000

UNITED STATES PATENT OFFICE.

NATHAN H. DAVIS, OF PHILADELPHIA, PENNSYLVANIA, ASSIGNOR TO KEYSTONE LANTERN COMPANY, A CORPORATION OF NEW JERSEY.

SCOOTER BRAKE.

Application filed November 9, 1926. Serial No. 147,216.

The present invention relates to a child's vehicle of that type known as a "scooter," having a platform on which a child stands and balances itself on one foot while pushing intermittently with the other foot to propel the vehicle over the ground.

When vehicles of this type are driven fast or are coasting down hill, they are likely to get out of control and cause an accident and perhaps injury to the child or to persons with whom the vehicle may come into collision.

The object of the present invention is to increase the safety with which such vehicles may be used, by providing means whereby the speed of the vehicle may be effectively regulated, the means being positive and reliable in operation, and being so simple that any child capable of riding such a vehicle can readily learn their proper use.

To this end the platform on which the child stands is mounted on the frame of the vehicle for limited rocking or teetering movement from front to rear, and carries a brake shoe which is supported adjacent to, but normally out of contact with, the rear wheel and which may be easily and quickly applied thereto by the child merely shifting its weight to rock the platform, it being possible by either shifting the weight gradually or suddenly to reduce the speed slowly or to bring the vehicle to a quick stop.

A further object of the invention is to provide a device of this character in which the brake shoe also serves as a mud guard, which is simple in construction and may be easily and cheaply manufactured, and which consists of but few parts and is not likely to get out of order.

With these and other objects in view, my invention comprises the various novel features of construction and arrangement and combination of parts hereinafter described and pointed out in the appended claims.

In the accompanying drawings illustrating one embodiment of the invention, and in which similar letters of reference indicate similar parts,—

Fig. 1 is a side elevation of a scooter embodying my invention, showing the platform in its normal position with the brake out of contact with the rear wheel;

Fig. 2 is an enlarged fragmentary side elevation, partly in longitudinal section, showing the platform in tilted position with the brake applied;

Fig. 3 is a section of the line 3—3 of Fig. 1.

Figs. 4, 5 and 6 are detailed views in transverse section, taken respectively on the lines 4—4, 5—5 and 6—6 of Fig. 1.

In its present form the scooter embodying my invention comprises a suitable frame 1, which preferably consists of a pair of side bars 2, the intermediate portions of which are arranged substantially horizontally in transversely spaced relation. The front ends of these bars are inclined upwardly and forwardly, as indicated at 3, and converge with their extremities suitably secured together and pivotally connected, as at 4, to a steering head 5.

At its lower end the steering head is provided with a fork 6, in which the front wheel 7 of the vehicle is mounted, while at its upper end it is equipped with a suitable handlebar 8 by means of which it may be conveniently turned to guide the vehicle.

The rear wheel 9 of the vehicle is mounted between the rear ends of the side bars 2, which are preferably upturned as indicated at 10. If desired, a U shaped stand 11, of well-known form, may be pivoted to the upturned extremities 10, so as to be adapted to be swung downwardly below the rear wheel when the scooter is not in use, to support it in an upright position.

Supported on the intermediate portions of the side bars 2 is a platform 12 of suitable size and shape to permit a child using the vehicle to stand thereon with one foot. This platform is pivotally mounted on the frame for free limited rocking or teetering movement relatively thereto about a transverse axis which is located intermediate of the ends of the platform. The pivotal mounting may be located below the plane of the axes of the front and rear wheels 7 and 9, with the platform close to the ground,—as is obviously desirable in the operation of a vehicle of this character.

As one means of effecting this pivotal mounting, a bracket 13 is secured to the under side of the platform and turns on a bolt 14 secured to and extending between the side bars 2. The bracket is substantially of inverted U shape and has its central portion or base 15 attached to the platform 12 and its sides depending therefrom and forming a pair of transversely spaced ears 16 which abut against the inner surfaces of the respective side bars 2, and are apertured, as at 17, to receive the bolt 14 and also a bushing 18 preferably mounted on the bolt between the side bars.

Another bracket 19 is secured to the under side of the platform in front of, and in longitudinal alinement with, the bracket 13, and engages the side bars 2 to guide the platform in its rocking movement, as well as to brace it laterally and relieve its pivot of excessive strain. The brackets 13 and 19 are preferably identical, for convenience of manufacture, and are attached to the platform by means of a longitudinally disposed cleat 20 which serves to reinforce the platform and fits snugly within both brackets to hold the same in alinement, fastening devices such as screws 21 being inserted through the cleat and the respective brackets and into the platform to secure these parts together.

The pivotal axis of the platform is arranged behind the center of gravity thereof so that the platform is normally held by gravity in a substantially horizontal position with its front portion suitably supported upon the frame of the vehicle. For the latter purpose a cross piece 22 is secured to the side bars 2 and extends upwardly therebetween to form a rest for the front portion of the platform. The cross piece 22 is substantially of inverted U shape and has its sides secured rigidly by rivets or other suitable fastening devices 23 to the respective side bars 2 and offset as indicated at 24 to form downwardly facing shoulders which bear upon the upper edges of the side bars so that the weight is transmitted directly thereto and the cross piece 22 is also held against any tendency to turn about its fastening devices 23.

At its rear end the platform 12 is equipped with a brake which is rigidly secured thereto as by means of a flat base 25 attached to the under side of the platform. A brake-shoe 26 projects upwardly from this base above the platform and is curved rearwardly to conform substantially to and extend part way around the periphery of the rear wheel 9, and may also be curved transversely to embrace the tread thereof. The shoe is thus adapted to have a broad bearing upon the wheel for effective braking action, and to serve, when out of contact therewith, as a mud guard.

In using the vehicle, the child stands on the platform on one foot with all or a preponderance of its weight upon the front portion of the platform, that is, in advance of the transverse pivot. With the weight so applied the platform remains in its normal position with the brake-shoe adjacent, but out of contact with, the rear wheel 9, as shown in Fig. 1, and forming a mud guard. The child pushes intermittently with its other foot to propel the vehicle over the ground in the usual manner.

To operate the brake it is merely necessary for the child to rock or tilt the platform rearwardly by shifting its weight thereon. This may be done by the child swaying its body rearwardly, or bearing on the rear end of the platform with its free foot, that is, the foot used to propel the vehicle. The movement of the platform applies the brake-shoe to the rear wheel as indicated in Fig. 2, and thus enables the child to readily control the speed of the vehicle. The brake-shoe, contacting with the wheel 9 limits the rocking movement of the platform rearwardly, and the arrangement is such that but little movement is required to apply the brake-shoe and hence the platform merely tilts slightly and remains substantially horizontal, so that at all times it affords a proper footing and is in riding position. The brake is positive in action and may be regulated to gradually retard the speed or to bring the vehicle to a quick stop, according to the pressure applied in rocking the platform. The bracket 19 guides the platform in its rocking movement and coacts with the bracket 13 to resist any lateral displacement of the same with respect to the frame and thus maintain the brake-shoe in alinement with and in cooperative relation to, the rear wheel, so that the brake is always ready for action.

It is to be understood that my invention may be embodied in various different forms of scooters from that herein described and illustrated. Furthermore, the pivot for the platform may be arranged in vertical alinement with, or even somewhat in advance of, the center of gravity thereof, in which instance the weight of the child riding the vehicle and standing on the front portion of the platform will serve to hold the same against its rest, with the brake-shoe normally inactive. Various other changes may be made in the form, arrangement and combinations of parts without departing from the spirit and scope of the invention as defined in the appended claims.

Having thus described my invention, I claim and desire to protect by Letters Patent of the United States—

1. In a child's vehicle of the character described, the combination with a frame, a wheel mounted therein, and a single platform carried by the frame, of means mounting the platform on the frame for free rocking movement relatively thereto, means limiting the rocking movement of the platform so that it is at all times substantially horizontal and in riding position, and means actuated by and upon the rocking of said platform in one direction, for applying braking pressure to said wheel.

2. In a child's vehicle of the character described, the combination with a frame, a wheel mounted therein, and a platform carried by the frame, of means mounting the platform on the frame for free rocking movement relatively thereto, and a brake shoe secured to and entirely supported by said platform and movable therewith by and upon the rocking thereof, into and out of contact with said wheel.

3. In a child's vehicle of the character described, the combination with a frame, a wheel mounted therein, and a platform carried by the frame, of means mounting the platform on the frame for independent rocking movement, and a brake shoe carried by said platform and movable by and upon the rocking thereof, into and out of contact with said wheel, said brake shoe extending over and part way around the wheel and forming a mud guard.

4. In a child's vehicle of the character described, the combination with a frame, a wheel mounted therein, and a platform carried by the frame, of a brake shoe carried by the platform adjacent said wheel, a pivotal connection between the platform and the frame permitting the free rocking of the platform to move the brake shoe into and out of contact with the wheel, the platform having its center of gravity to one side of its pivotal axis and being gravity-actuated normally to support said brake shoe out of contact with said wheel and means limiting the free rocking movement of the platform so that it is at all times substantially horizontal and in riding position.

5. In a child's vehicle of the character described, the combination with a wheeled frame, and a platform carried thereby, of means mounting the platform on the frame for free teetering movement relatively thereto, a brake shoe carried by said platform and extending therefrom adjacent the periphery of a wheel of said frame and movable with said platform by and upon the teetering thereof, into and out of contact with such wheel, and a member between said platform and said frame, secured to one of said parts and slidably engaging the other part to guide the platform in its teetering movement and maintain the brake shoe in alinement with said wheel.

6. The combination with a "scooter", comprising front and rear wheels, an intermediate frame, and a platform supported on the frame between said wheels, of means pivotally mounting the platform on the frame for free teetering movement from front to rear, means for limiting the movement of the platform so that it at all times provides a substantially horizontal foothold and is in riding position, and means for applying braking pressure to the rear wheel by and upon the teetering movement of the platform in one direction.

7. The combination with a "scooter", comprising front and rear wheels, an intermediate frame, and a platform supported on the frame between said wheels, of means pivotally mounting the platform on the frame for free, limited teetering movement from front to rear, said pivotal mounting being located below the plane of the axes of the front and rear wheels, and means for applying braking pressure to the rear wheel by and upon the teetering movement of the platform in one direction.

In testimony whereof, I have signed my name to this specification.

NATHAN H. DAVIS.